United States Patent
Merchant et al.

(10) Patent No.: US 6,732,184 B1
(45) Date of Patent: May 4, 2004

(54) ADDRESS TABLE OVERFLOW MANAGEMENT IN A NETWORK SWITCH

(75) Inventors: Shashank Merchant, Santa Clara, CA (US); Ching Yu, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 668 days.

(21) Appl. No.: 09/604,266

(22) Filed: Jun. 26, 2000

Related U.S. Application Data

(60) Provisional application No. 60/179,138, filed on Jan. 31, 2000.

(51) Int. Cl.[7] .............................................. G06F 13/00
(52) U.S. Cl. .................. 709/238; 709/245; 370/395.31; 370/395.7
(58) Field of Search ................................ 709/223, 224, 709/238, 245, 253; 370/389, 395.7, 392, 395.31

(56) References Cited

U.S. PATENT DOCUMENTS

| | | | | |
|---|---|---|---|---|
| 5,515,376 A | | 5/1996 | Murthy et al. | |
| 5,617,547 A | * | 4/1997 | Feeney et al. | 395/311 |
| 5,909,564 A | * | 6/1999 | Alexander et al. | 395/311 |
| 6,151,297 A | * | 11/2000 | Congdon et al. | 370/216 |
| 6,301,645 B1 | * | 10/2001 | Porterfield | 711/206 |
| 6,560,229 B1 | * | 5/2003 | Kadambi et al. | 370/392 |

* cited by examiner

Primary Examiner—Viet D. Vu

(57) ABSTRACT

A switching system includes a multiport module having an address table for storing network addresses, and a host processor configured for selectively swapping the stored network addresses in the address table to an internal memory that serves as an overflow address table for the multiport switch module. The address table internal to the multiport module is configured for storing a prescribed number of network addresses for high-speed access, for example the most frequently-used network addresses. The host processor, configured for controlling the storage of network addresses between the address table and the external memory, uses the external memory as the overflow address table for storage of less frequently-used network addresses, for example addresses of network devices that transmit little more than periodic "keep-alive" frames. Hence, a large number of addresses may be managed by the switching system, without the necessity of an unusually large on-chip address table.

12 Claims, 10 Drawing Sheets

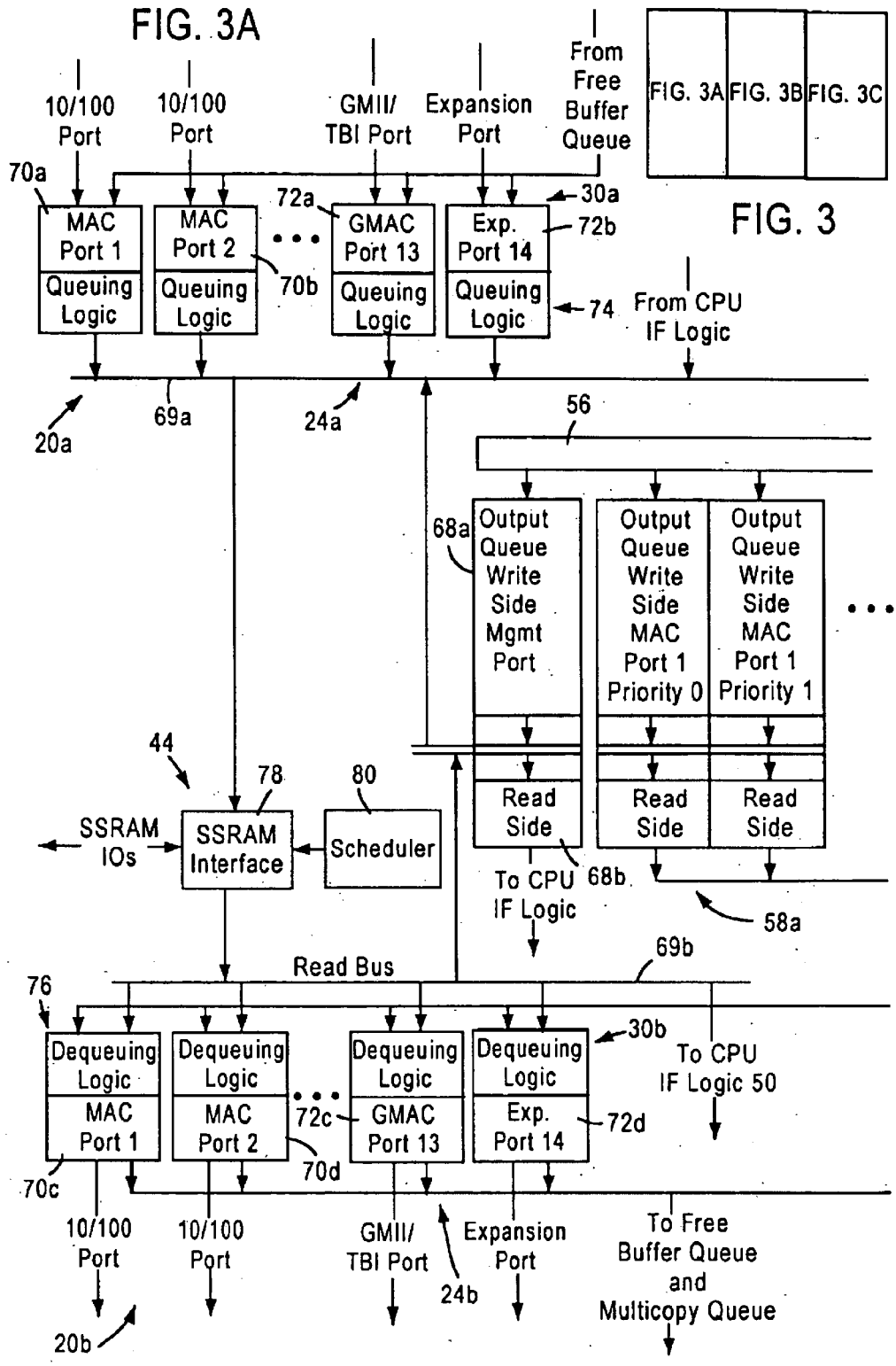

ADDRESS TABLE OVERFLOW MANAGEMENT IN A NETWORK SWITCH

RELATED APPLICATIONS

This application contains subject matter related to the subject matter disclosed in copending U.S. patent application Ser. No. 60/179,138, filed on Jan. 31, 2000,

TECHNICAL FIELD

The present invention relates to network communications and more particularly, to managing an address table in a network switch.

BACKGROUND ART

In computer networks, a plurality of network stations are interconnected via a communications medium. For example, Ethernet is a commonly used local area network scheme in which multiple stations are connected to a single shared serial data path. These stations often communicate with a switch that replaces the shared data path. End stations are connected directly to the switch or to LAN segments that are connected to the switch. Typically, the switch controls the communication of data packets on the network.

The network switch includes switching logic for receiving and forwarding frames to the appropriate destinations. One arrangement for generating a frame forwarding decision uses a direct addressing scheme, where the network switch includes an address table storing switching logic for the destination addresses.

For example, a frame may be received by the network switch with header information indicating the source address and destination address of the frame. The switching logic accesses the address table using the source address and destination address as lookups to find the appropriate frame forwarding information. The switch then uses this information and sends the frame to the appropriate port(s).

One drawback with typical prior art systems employing address tables is that the address table is too small to store address entries for all of the network stations that may be transmitting/receiving data. Additionally, stations that may not be transmitting or receiving data within preset periods of time may be "aged" out of the address table, i.e., the address entry deleted or invalidated. After an address is aged out of the table, any frames sent to the deleted address will be flooded to all parts on the switch. This causes unnecessary traffic, and is a poor use of the bandwidth of the end stations that have to receive the unwanted frames.

SUMMARY OF THE INVENTION

There exists a need for a switching device that is able to support networks including a large number of stations.

There is also a need for a switching device that includes a programmable address table and is configured to support communications with an overflow address table.

These and other needs are met by the present invention, where a multiport switch includes a decision making engine used to make frame forwarding decisions. The decision making engine is designed to search the address table for frame forwarding information. If the destination address is not found in the address table, the frame is flooded to all parts, excluding the receive port. Depending on the contents of the last table entry that was searched, the frame is also forwarded to the host CPU so that the host CPU can swap the address back into the address table.

Still another aspect provides a switching system comprising: a multiport switch module having a plurality of network switch ports and an address table for storage of network addresses, the multiport switch module configured for searching the address table for an identified network address and outputting a descriptor indicating whether the identified network address was located in the multiport switch module; an external memory configured for storing overflow network addresses; and a host processor configured for controlling the storage of the network addresses and the overflow network addresses in the address table and the external memory, respectively, the host processor selectively swapping address entries between the address table and the external memory based on the descriptor.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

FIGS. 3, 3A–3C are diagrams summarizing a detailed block diagram illustrating the switching subsystem of FIG. 2.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
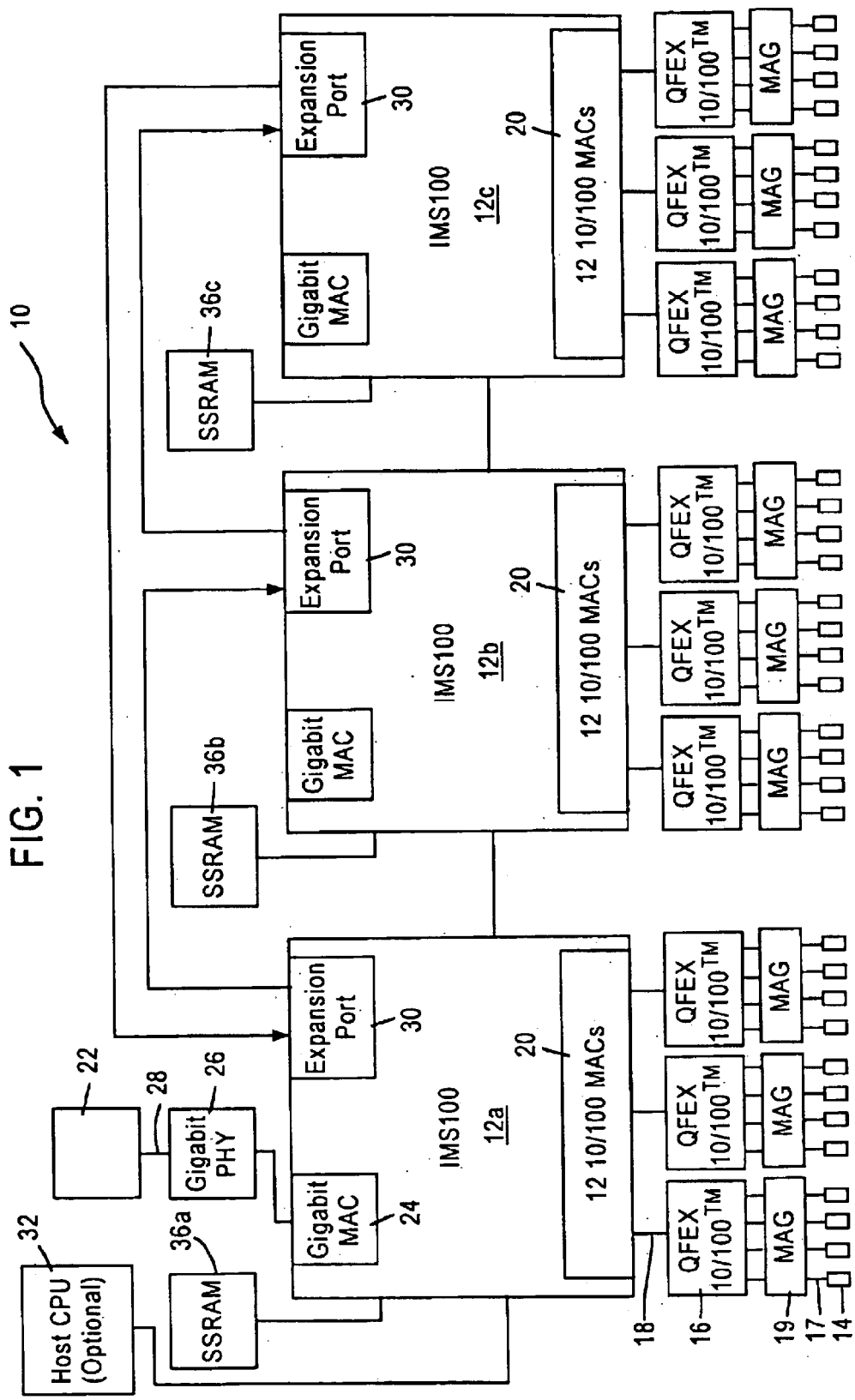
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. Each part of the switch 12 is connected to a separate LAN segment, also known as a collision domain. End stations connected to different ports do not contend for the same channel. Only these stations connected the same port will contend for a channel. In common configurations of a multiport switch, however, a single end station 14 will be connected to each port of the switch 12.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. Each switch port connects to an RMII bus, which in turn connects to a PHY transceiver 16. A magnetic transformer 19 provides AC coupling between the PHY transceiver 16 and the corresponding network medium 17, which may be a twisted-pair cable of up to 100 meters in length, for example. The end station is at the other end of the cable. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
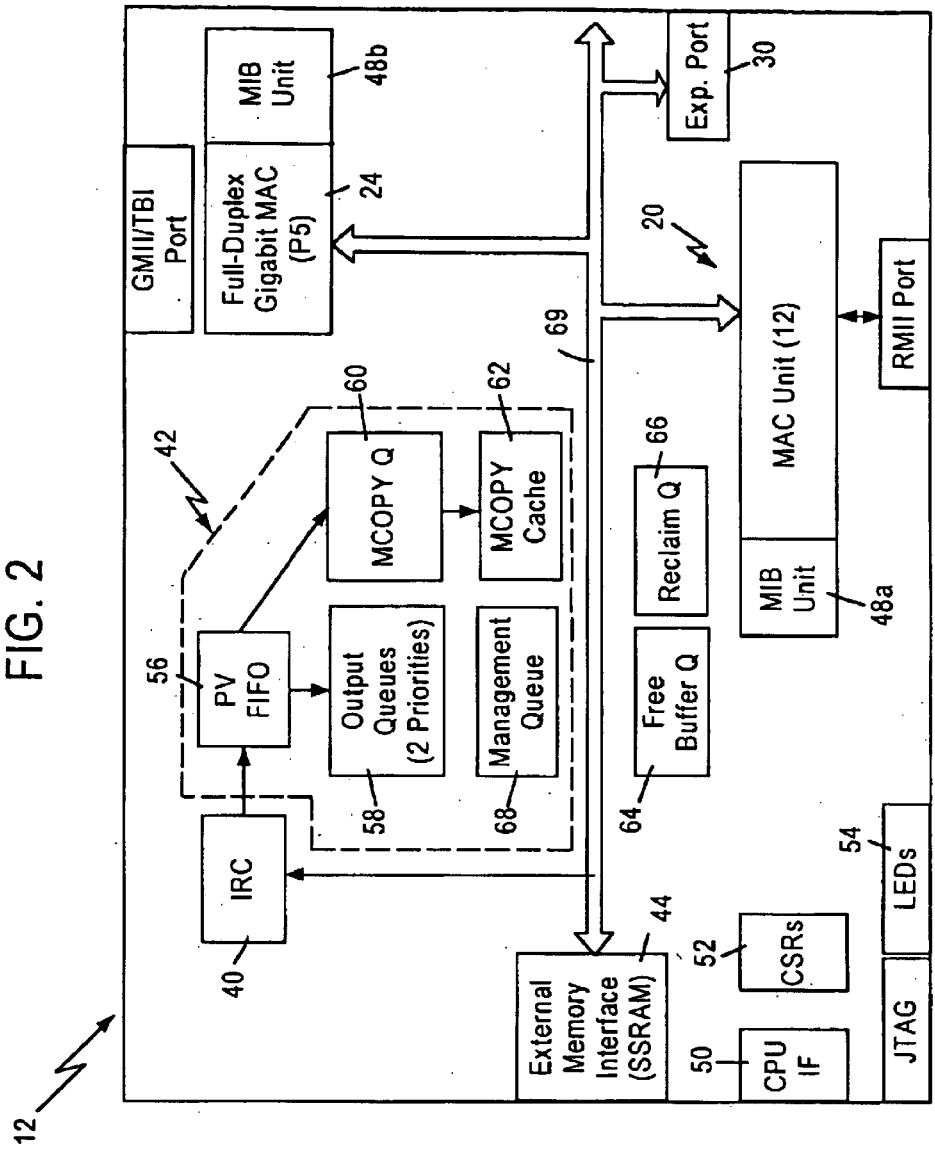
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multi-copy queue 60, a multi-copy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual (multicast) address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, VLAN information, vector identifying each MAC port that should include VLAN information during transmission, opcode, and frame pointer. The format of the forwarding descriptor will discussed further with respect to FIG. 8. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supplies the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multi-copy queue 60 and the multi-copy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
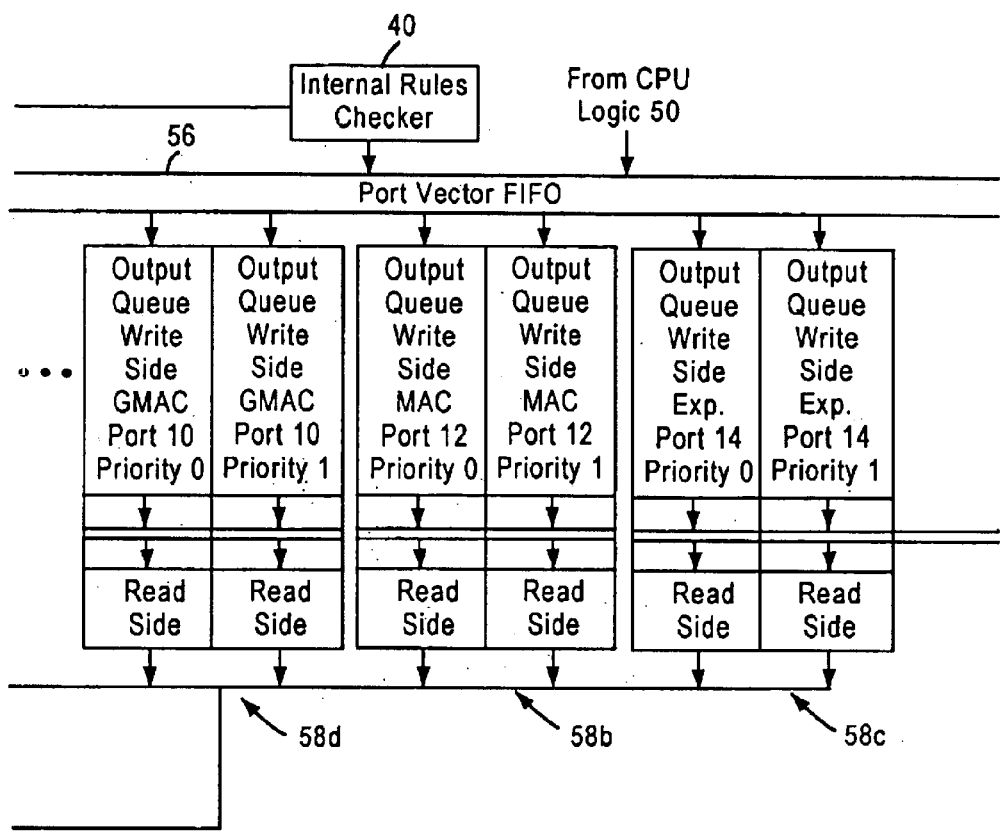
Figure 3C:
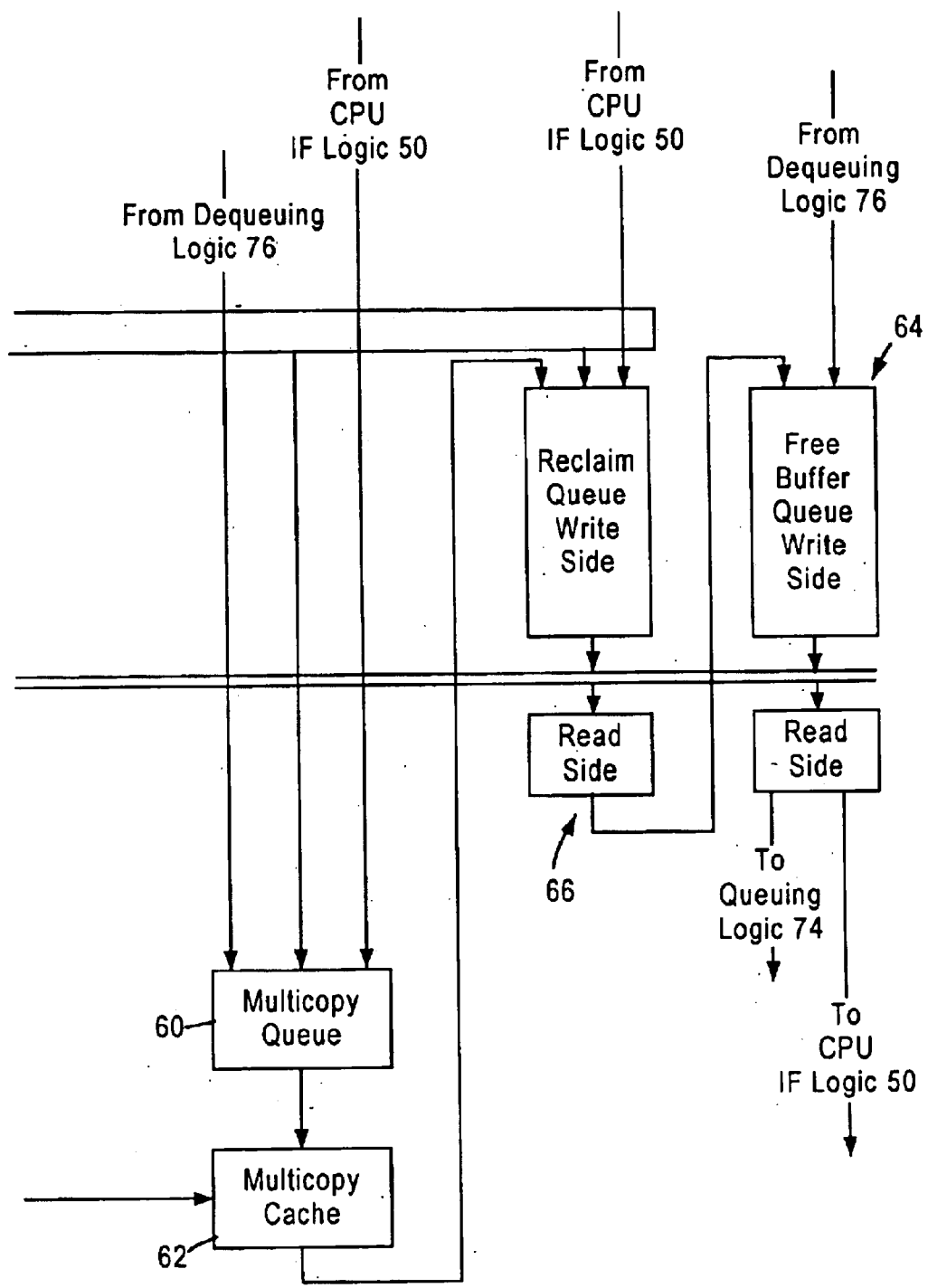

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data are then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multi-copy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multi-copy queue 60, the reclaim queue 66, and the multi-copy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multi-copy frames, the port vector FIFO 56 supplies multiple copies of the same frame pointer to more than one output queue 58, each frame pointer having a unicopy bit set to zero. The port vector FIFO 56 also copies the frame pointer and the copy count to the multi-copy queue 60. The multi-copy queue 60 writes the copy count to the multi-copy cache 62. The multi-copy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multi-copy frame pointer, the dequeuing logic 76 writes the frame pointer with a copy count of minus one (−1) to the multi-copy queue 60. The multi-copy queue 60 adds the copy count to the entry stored in the multi-copy cache 62.

When the copy count in multi-copy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 is described below.

Address Table Overflow Management

The present invention is directed to the internal rules checker 40 (IRC) and the management of the IRC address table. As described previously, the switch subsystem 42 provides the switching logic for receiving and forwarding frames to the appropriate output port(s). The forwarding decisions, however, are made by the IRC 40 located on the multiport switch 12.

In particular, the disclosed embodiment is directed to address table overflow management between the IRC 40 and a host processor memory 500 associated with the host CPU 32. In particular, a limited number of addresses are stored on the on-chip memory on the IRC 40, and the remaining addresses are stored in the host processor memory. The host processor 32 may use any of several cache management algorithms to determine which addresses should be stored in the on-chip memory in the IRC 40. Hence, the address table overflows scheme described below is particularly effective in a switched domain that includes thousands of end stations, most of which are idle most of the time and continue to send periodic "keep alive" frames at a sufficient rate to prevent the associated addresses from being deleted from the switching memory; in this case, the on-chip memory in the IRC 40 can store the most heavily used addresses, while the host system memory 500 stores the less-frequently used addresses.

Figure 4:
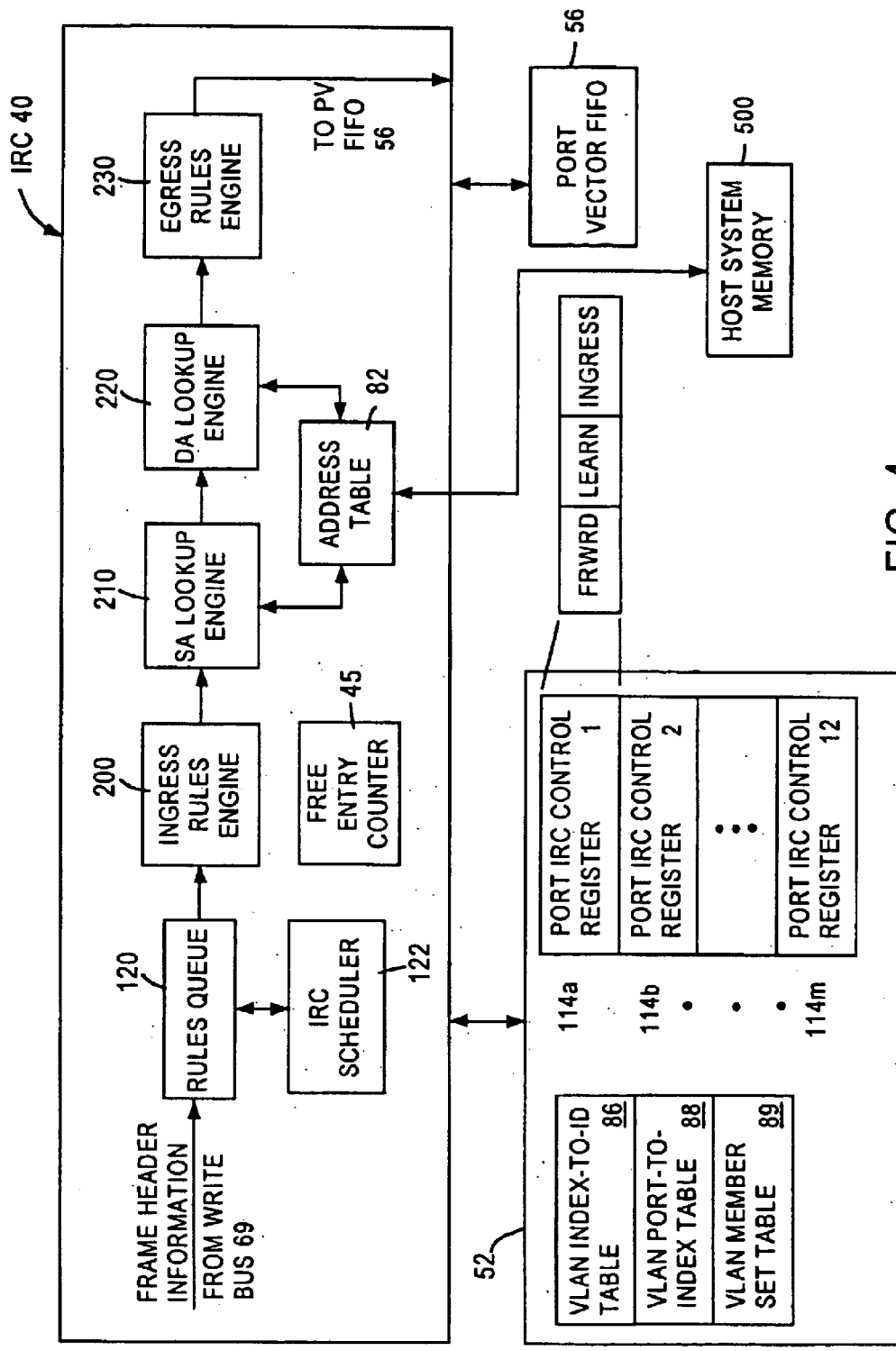
FIG. 4 is a block diagram of a system including the internal rules checker of FIG. 2 in accordance with an embodiment of the present invention.

As shown in FIG. 4, the IRC 40 includes four functional logic blocks, namely an ingress rules engine 200, a source address (SA) lookup engine 210, a destination address (DA) lookup engine 220 and an egress rules engine 230. In the exemplary embodiment, the four engines 200, 210, 220 and 230 are employed as separate logic devices. In other words, each engine is designed in a modular fashion to receive input from other devices and to perform its particular functions without relying on processing logic from another logic engine. However, in alternative configurations, the individual functions performed by each logic engine, discussed in detail below, as well as the particular number of logic engines may be modified, based on the particular network requirements.

The IRC 40 also includes an on-chip address table 82; the address table 82 may alternatively be located outside the IRC 40 but remain on-chip within another part of the multiport switch 12. According to the exemplary embodiment, the on-chip address table 82 stores approximately 4000 network addresses. The number of addresses and VLANs supported by the IRC 40, however, is substantially increased by swapping of addresses between the address table 82 and the host system memory 500 by the host CPU 32.

VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data. These VLAN groupings can be thought of as "sub-networks" within a larger network.

Figure 5:
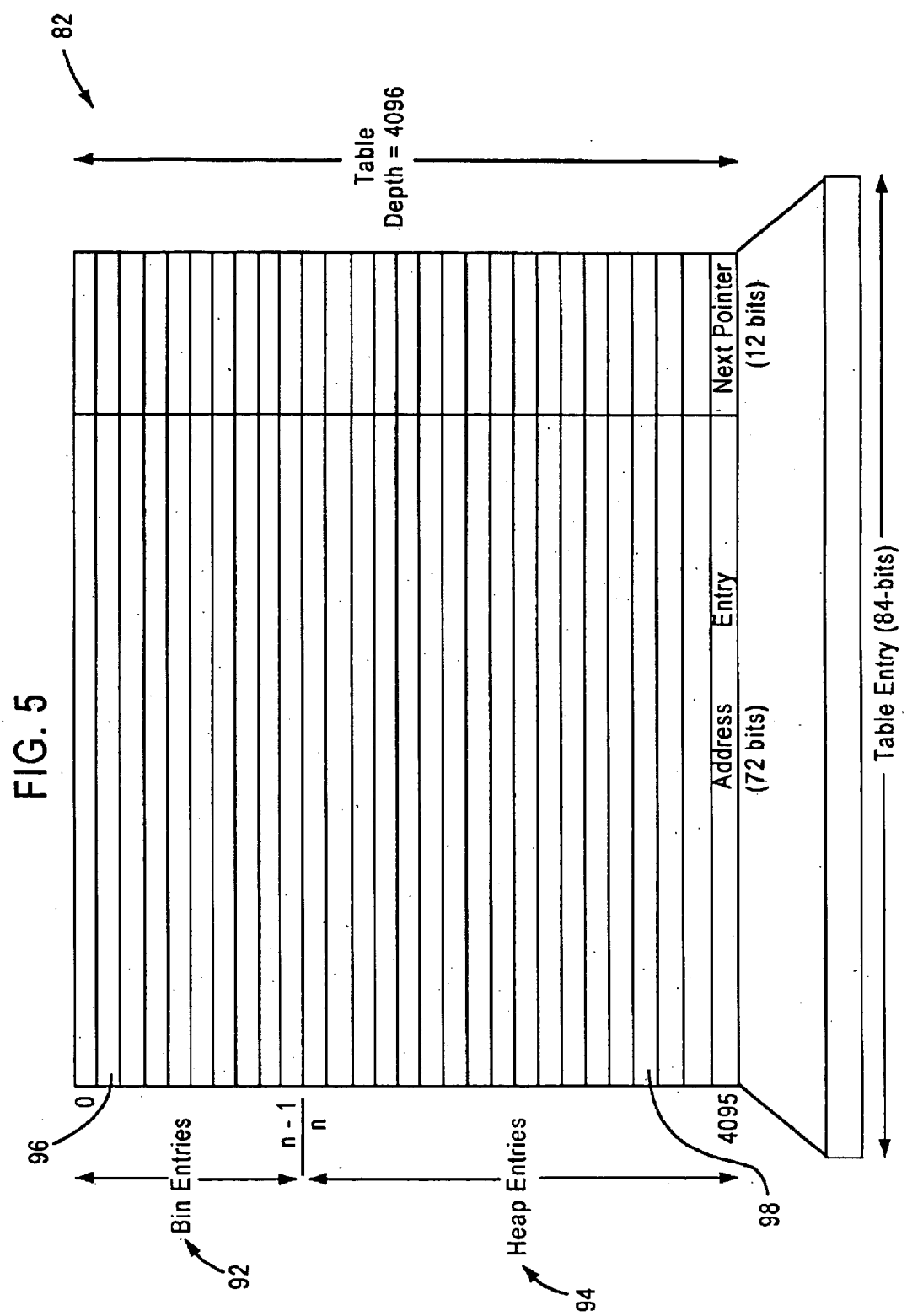
FIG. 5 illustrates the composition of the IRC address table of FIG. 4.

FIG. 5 illustrates the organization of the IRC address table 82. The IRC address table 82 contains an array 4096 entries. The first "n" entries 92 are referred to as "bin entries" and have addresses from "0" to "n−1". The remaining entries 94 are referred to as "heap entries" and have addresses from "n" to "4095". Each of the table entries includes a 72-bit address entry field and a 12-bit "next pointer" field.

Figure 6:
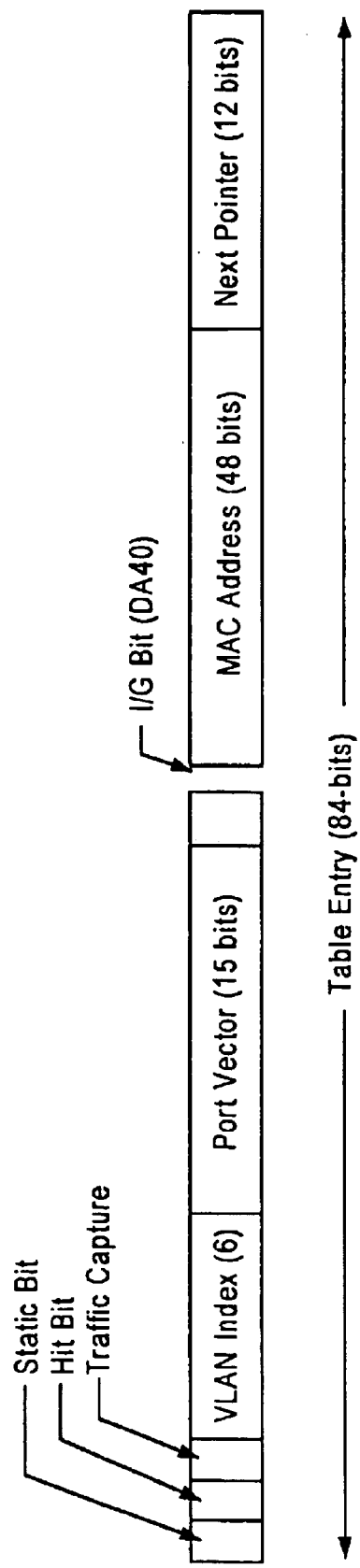
FIG. 6 illustrates the format of an IRC address table entry of the IRC address table of FIG. 5.

FIG. 6 illustrates the composition of each 88-bit table entry shown in FIG. 5. The hit bit is used for address entry "aging" to invalidate or delete entries from the address table 82 that have not been used in a predetermined amount of time. The static bit is used to prevent aging of an address entry.

The traffic capture bit identifies traffic capture source and destination MAC addresses for mirroring MAC conversations to the management queue 68.

The VLAN index field is a 6-bit field used to reference a 12-bit VLAN identifier (ID). The VLAN index-to-VLAN ID table 86, shown in FIG. 4, contains the mapping associations. The switch 12 receives both tagged and untagged frames. When the switch 12 receives untagged data frames, i.e., without VLAN tag information, the IRC 40 assigns a VLAN index from the VLAN port-to-index table 88, shown in FIG. 4, based on the receive port on which the frame is received. The VLAN index-to-ID table 86 and the VLAN port-to-index table 88 are located with the configuration and status registers 52. However, in alternative configurations, the tables 86 and 88 may be located within the IRC 40.

The port vector is a 15-bit field that provides a forwarding descriptor with a vector identifying the port(s) to which the frame should be forwarded.

The MAC address field is a 48-bit field that includes addresses for both source addresses and destination addresses. The addresses can be unicast, multicast or broadcast. An individual/group (I/G) bit is also included in the MAC address field.

In the exemplary embodiment of the present invention, the host CPU 32 functions as the management entity and is connected to the IRC 40 via the CPU IF 50. Hence, transfers between the address table 82 and the host system memory 500 occur via the CPU IF 50.

The host CPU 32 is responsible for initializing the values in the address table 82. Upon power-up, the host CPU 32 loads values into the bin entries 92 based on the network configuration, including VLAN configurations. The heap entries 94 are not fixed at power-up and are used for adding entries to the address table 82. The IRC 40 uses the specific fields of the address table 82 to make frame-forwarding decisions when frames are received in the switch 12. More specifically, the IRC 40 uses engines 200–230 to generate frame forwarding information and to create a forwarding descriptor for output to the port vector FIFO 56.

As discussed previously, the multiport switch 12 stores incoming data frames in external memory 36. According to the exemplary embodiment illustrated in FIG. 4, the IRC 40 also includes a 4-deep rules queue 120 allocated for each receive port, i.e., the queue corresponding to each receive port holds four frame headers. However, in alternative configurations, the rules queue 120 may be configured to store other numbers of frame headers for each port, based on the particular network requirements.

The rules queue 120 "snoops" on the write bus 69 to external memory 36 to capture frame header information from the data frames transferred by queuing logic 74 to the buffers in external memory 36. When a frame has been completely transferred to external memory 36, the queuing logic 74 signals the end of the transfer and provides frame status information indicating whether the frame was received without errors. The IRC 40 also includes IRC scheduler 122, illustrated in FIG. 4, which monitors the signaling from queuing logic 74 and stores the frame status information in the rules queue 120 along with the corresponding frame header.

The rules queue 120 also monitors the number of entries associated with each port. When a queue for a receive port has three entries, the IRC 40 may signal flow-control/backpressure logic associated with that receive port in order to regulate network activity.

When the end of frame (EOF) transfer has been signaled by the queuing logic 74, the IRC scheduler 122 enables the processing of the frame header through the ingress rules engine 200.

The ingress rules engine 200 performs a variety of preprocessing functions for each frame header. For example, ingress rules engine 200 checks to see if a data frame was received with errors by reading the frame status information stored with the respective frame headers in rules queue 120. When the ingress rules engine 200 determines that a receive error has occurred, the ingress rules engine 200 constructs a forwarding descriptor with a null port vector, e.g., a port vector with all zeros or some other predetermined value, that will cause the frame to be discarded. Optionally, frames with errors may be forwarded to the host CPU 32 for diagnostic purposes.

The ingress rules engine 200 also checks the destination address (DA) of the frame to determine if the frame should be sent to the management entity, e.g., host CPU 32. Specifically, the ingress rules engine 200 looks for Bridge Protocol Data Units (BPDUs), Generic Attribute Registrations Protocol (GARP) frames, MAC Control Frames and frames with certain Physical MAC addresses. The ingress rules engine 200 identifies these types of frames based on their specific destination address information. When the ingress rules engine 200 detects a match with one of the above DAs, the ingress rules engine 200 constructs a forwarding descriptor identifying the management port.

The ingress rules engine 200 also determines whether SA and DA lookups will be performed by engines 210 and 220, respectively, based on whether learning and forwarding are set in the respective port IRC control registers 114a–m, illustrated in FIG. 4. According to the exemplary embodiment of the invention, the multiport switch 12 includes one port IRC control register 114 for each e twelve 10/100 Mb/s ports and for the 1 Gb/s port.

Referring to FIG. 4, each port IRC control register 114 includes a learn bit and a forward (frwrd) bit. A set learn bit allows the IRC to "learn" unknown MAC source addresses received by the corresponding port, i.e., add new entries not stored in address table 82. A set frwrd bit allows frames received by the corresponding port to be forwarded to other ports and allows frames received by other ports to be transmitted from this port.

When learning is set and forwarding is not set in the port IRC control register 114 corresponding to the port on which the frame was received, only the SA lookup is performed. That is, the SA lookup is performed so that a new entry may be added to the address table 82 and the SA lookup engine 210 generates a forwarding descriptor with a null port vector. The SA lookup engine 210 then transmits the forwarding descriptor to the port vector FIFO 56. When learning and forwarding are both set in the port IRC control register 114 corresponding to the receive port, both SA and DA lookups are performed, as discussed in more detail below. When learning and forwarding are both clear in the port IRC control register 114 corresponding to the receive port, neither the SA nor DA lookups is performed. In this case, the ingress rules engine 200 generates a forwarding descriptor with a null port vector.

After processing by ingress rules engine 200, the IRC 40 performs SA and DA searches of address table 82, based on whether learning and forwarding are enabled as discussed above. The multiport switch 12 needs to make frame forwarding decisions relatively quickly, since multiple data frames may be received by the multiport switch 12 simultaneously. Hence, in the exemplary embodiment of the present invention, a hashing scheme is used to search only a subset of the address entries, as described below. The memory structure of FIG. 5 provides an indexed arrangement, where a given network address will be assigned to a corresponding bin. In other words, each bin entry 96 is configured to reference a plurality of table entries (i.e., heap entries) 98. Hence, the SA lookup engine 210 performs a search of the address table 82 by first accessing a specific bin 96 pointed to by a hash key, and then searching the entries within (i.e., referenced by) the corresponding bin to locate the appropriate match. Any conventional hashing scheme may be used in the SA search.

After the bin number is calculated, the SA lookup engine 210 searches the bin list of the particular bin for an address entry whose address and VLAN index match the source address (SA) and VLAN index of the received frame.

Each bin entry 96 is the starting point for the search by the SA lookup engine 210 for a particular address within the address table 82. A bin entry may reference no addresses (i.e., be empty), may reference only one address within the bin entry location, or may reference a plurality of addresses using a linked list chain structure.

Figure 7:
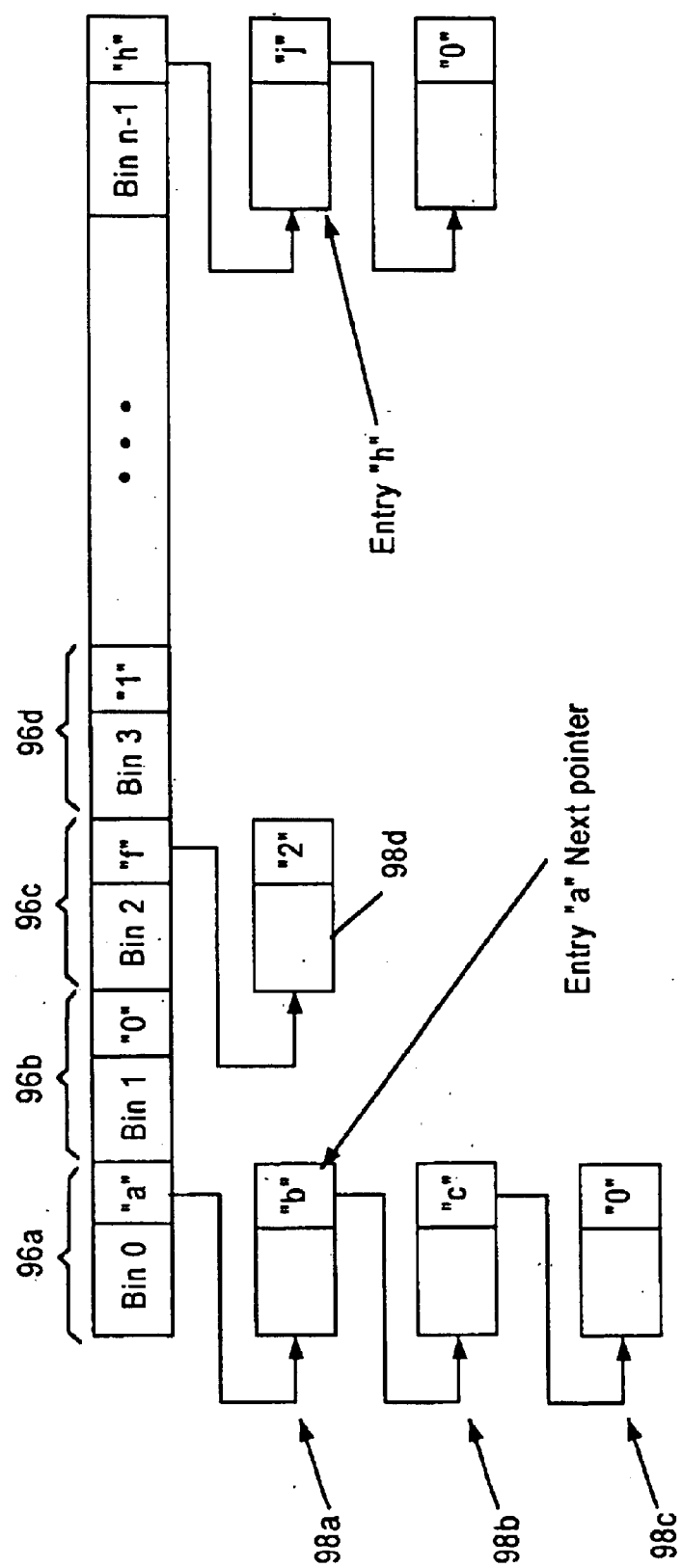
FIG. 7 illustrates linked list chains for identifying table entries relative to a selected bin.

FIG. 7 is a diagram illustrating bin entries referencing a different number of table entries. Each of the bin entries 96 and heap entries 98 includes 72-bit address entry and a 12-bit "next pointer" field. The "next pointer" field associated with the bin entry 96 identifies the location of the next entry in the chain of linked list addresses; the "next pointer" field may point to another entry in the address table 82, or may specify that the bin list is continued in the host memory 500. Table 1 illustrates how the next pointer field of an address table entry specifies the characteristics of the bin list:

| Pointer Field Value | Bin Characteristic |
| --- | --- |
| 0 | End of bin list |
| 1 | Bin list is empty |
| 2 | Bin list is continued in host memory 500 |
| 3 | Bin entry is empty but the bin list is continued in host memory 500 |
| Greater than 3 | Pointer to next entry |

For example, Bin 3, 96d, of FIG. 7 does not have any associated table entries. In such a case, the 72-bit address entry equals zero (or another null value), and the bin's corresponding "next pointer" field will have a value of "1", indicating no entries for the corresponding bin. If a bin such as Bin 1, 96b, contains a single table entry, the bin entry will store the switching logic data for that single address in its address entry field, and store the value "zero" in the "next pointer" field, indicating there are no further address entries in the chain.

Bin 0, 96a, however, references four addresses by using the "next pointer" field to identify the location of the next entry in the chain. The additional entries 96b–96d in the bin are linked in a linear list, as shown in FIG. 7. Thus, the first entry of Bin 0 is stored in the address entry field of the bin entry 96a and the next entry (heap entry 98a) is referenced by address entry "a" in the next pointer field of the bin entry 96a.

As described above, a bin list may be continued in host CPU 32 memory 500. When the next pointer field of an address entry (e.g., entry 98d) is "2", the bin list is continued in host CPU 32 memory 500. Additionally, when a next pointer field is "3", this indicates that the bin is empty, but is continued in host CPU 32 memory.

When the IRC determines that the source address of a frame is not in the address table and the table is not completely full, the IRC creates a new entry and forwards the frame to the host computer. The frame's forwarding opcode is updated to indicate why the frame was forwarded. For example, in an exemplary embodiment of the present invention, when the frame is forwarded because the SA was learned, bit nine of the 12-bit opcode is set.

Alternatively, when the frame is forwarded because the SA search was incomplete, i.e., a next pointer of "2" or "3" was encountered, bit eight of the 12-bit opcode is set.

In this manner, the multiport switch 12 is able to store additional station addresses in an off-chip overflow memory. In a typical switched domain that includes thousands of end stations, most of the stations are idle most of the time. The off-chip memory located at the host CPU 32 is able to store these station addresses which often transmit "keep alive" frames to prevent their addresses from aging out of the address table. The process of address overflow operation will become more apparent following a review of the forwarding descriptor.

Figure 8:
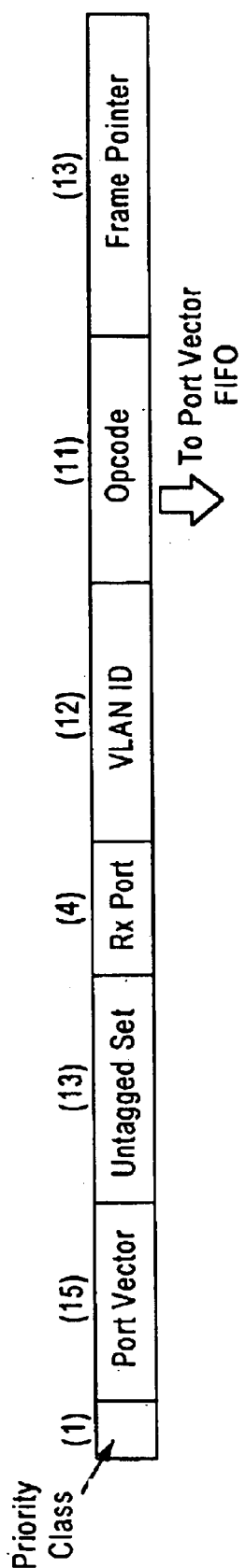
FIG. 8 illustrates the composition of the forwarding descriptor in accordance with an embodiment of the present invention.

FIG. 8 illustrates the composition of the forwarding descriptor according to an embodiment of the present invention. Referring to FIG. 8, the priority class field is a one-bit field that indicates the output priority queue in which the frame pointer should be placed, e.g., high priority or low priority.

The port vector field is a 15-bit field that identifies each port(s) that should receive the data frame for transmission to its destination address. Bit 0 of the port vector field corresponds to Port 0 (the management port), bits 1–12 correspond to MAC ports 1–12 respectively (the 10/100 Mb/s ports), bit 13 corresponds to the gigabit port 24 and bit 14 corresponds to the expansion port 30.

The untagged set field is a thirteen-bit field that indicates which ports should remove VLAN tag headers before transmitting frames. The untagged set is obtained from an untagged set table. The Rx port is a four-bit field that indicates the port from which the frame was received.

The VLAN ID field is a 12-bit field that includes the VLAN identifier associated with the frame. The opcode is an 11-bit field that contains instructions about how the frame should be modified before transmission and information that the host CPU 32 can use for processing frames from the management queue. The frame pointer is a 13-bit field that contains the location of the frame stored in external memory 36.

The opcode field of the forwarding descriptor includes information that enables the host CPU 32 to determine whether an address search is necessary within the host system memory 500, or whether addresses should be swapped between the address table 82 and the host system memory 500. Table 2 illustrates how the host CPU 32 interprets the opcode bits.

| Opcode Bits | Opcode Description |
|---|---|
| 11 | Table Full (FEC below threshold) |
| 10 | Unable to Learn SA |
| 9 | SA Learned |
| 8 | SA Search Incomplete (SA search found link = 2 or 3) |
| 7 | DA Search Incomplete (DA search found link = 2 or 3) |
| 6 | Traffic Capture bit set in address table |
| 5 | Unknown VLAN ID |
| 4–3 | 00 = BPDU, GARP, MAC Control or directed frame |
|  | 01 = IGMP frame |
|  | 10 = DA lookup added Port - to Port Vector |
|  | 11 = Error in received frame |
| 2 | GMAC Cascade Tag |
|  | 1 = Strip Cascade Tag from frame |
|  | 0 = Insert Cascade Tag in frame |
| 1–0 | Frame Type |
|  | 00 = Untagged |
|  | 01 = Priority-Tagged |
|  | 10 = VLAN-Tagged |
|  | 11 = Reserved |

As described above, the IRC 40 generates a forwarding descriptor based on searching the address table 82. Based on the forwarding descriptors supplied by the IRC 40 to the host CPU 32, the host CPU may either search the host system memory 500, or may swap addresses table 82 and the host system memory 500.

The host CPU 32 does not participate in the forwarding process. For example, if the DA search encounters a "2" or "3" in a next pointer field, the frame is forwarded by the IRC 40 to the host CPU 32 where it will be stored, and the DA search Incomplete bit is set in the forwarding opcode. In addition, the frame is flooded to the output ports.

However, when the host CPU 32 receives a frame whose forwarding opcode has its DA Search Incomplete bit set, the host CPU 32 searches the appropriate overflow bin in the host system memory 5000. If the host CPU 32 finds a matching entry, it swaps the entry back into the address table 82 located on the multiport switch. If the Table Full bit in the forwarding opcode is clear, the host CPU 32 moves one more entries from overflow bins in memory into the switch address table.

In an alternative embodiment of the present invention, the host CPU 32 continues the search for a forwarding port vector. In this arrangement, the host CPU 32 continues the DA lookup to identify the forwarding port vector. If no match is found, the frame is then flooded to the output port.

Aging logic within the IRC 40 monitors the age of the last heap entry in the bin list 96. Before the hardware aging logic deletes the last heap entry, it copies the link field of the last entry into the link field of the next to last entry. If there is only one entry in the bin list, namely the bin entry, and that entry must be deleted, the new value of the bin entries link field depends on the previous value. The value 0 is changed to 1, and the value 2 is changed to 3. The host processor 32 can assist in the aging process by moving entries from the overflow bins in the host system memory 500 into the hardware address table at any time it determines that the free entry counter 45 of FIG. 4 is above a prescribed threshold. The free entry counter 45 indicates the number of address table heap entries that are currently unused. The host CPU 32 can read from or write to the counter when the free entry list is locked. A comparator (not shown) indicates when the value of the counter 45 is less than a fixed threshold, for example a value of 16. The host CPU 32 can probe the free entry counter 45 periodically, or can wait until it receives a frame whose forwarding opcode has its Table Full bit set.

According to the disclosed embodiment, the host CPU 32 establishes an address table overflow scheme in the host system memory 500, enabling an expanded memory structure for the address table 82 in the IRC 40. Hence, a larger number of addresses may be used by the multiple port switch 12, without expanding the size of the address table 82. The host processor 32 may use any of several cache management algorithms to determine which addresses should be kept in the on-chip memory 82.

What is claimed is:

1. A method in a switching system having a multiport switch module and a host processor configured for controlling the multiport switch module, the multiport switch module being configured to receive and forward data frames to appropriate destinations, the method comprising:

when making a frame forwarding decision, searching for a network address in an address table in the multiport switch module;

outputting from the multiport switch module a descriptor indicating whether the network address was located in the multiport switch module; and selectively searching by the host processor, based on the descriptor, for the network address in a memory external to the multiport switch module.

2. The method of claim 1, further comprising storing the network address by the host processor in the memory.

3. The method of claim 2, further comprising transferring by the host processor the network address stored in the memory to the address table based on a determined availability of space in the address table.

4. The method of claim 2, further comprising swapping by the host processor the network address stored in the memory with an aged entry in the address table based on a determined unavailability of space in the address table.

5. The method of claim 1, further comprising:
identifying an aged entry in the address table;
copying the aged entry to the memory; and
deleting the aged entry from the address table.

6. The method of claim 1, further comprising:
selectively creating a new entry for the network address in the address table by the multiport switch based on a determined availability of space in the address table; and selectively deleting a duplicate entry of the network address in the memory by the host processor based on the creation of the new entry.

7. A method in a switching system comprising a multiport switch module configured for receiving and forwarding data frames to appropriate destinations, the multiport switch module having an address table for storage of network addresses used by the multiport switch module to make frame forwarding decision, and a host processor configured for controlling the multiport switch module, the method comprising:

determining whether there is an unavailability of free space in the address table by the host processor; and selectively replacing one of the stored network addresses in the address table with another network address stored in an external memory accessible by the host processor, based on the determined unavailability of free space-in the address table.

8. The method of claim 7, wherein the determining step includes determining a free entry value in a free entry counter configured for counting a number of free entries in the address table.

9. The method of claim 8, wherein the selectively replacing step includes:

copying the one stored network address to the external memory and deleting the one stored network address from the address table by the multiport switch based on a determined age of the one stored network address; and copying the another network address from the external memory to the address table by the host processor.

10. A switching system comprising:

a multiport switch module configured to receive and forward data frames to appropriate destinations, the multiport switch module having a plurality of network switch ports and an address table for storage of network addresses used by the multiport switch module to make frame forwarding decision, the multiport switch module configured for searching the address table for an identified network address and outputting a descriptor indicating whether the identified network address was located in the multiport switch module;

an external memory configured for storing overflow network addresses; and a host processor configured for controlling the storage of the network addresses and the overflow network addresses in the address table and the external memory, respectively, the host processor selectively swapping address entries between the address table and the external memory based on the descriptor.

11. The system of claim 10, wherein the multiport switch module further includes a free entry counter configured for counting a number of free entries in the address table, the host processor selectively removing a selected one of the address entries based on the counted number of free entries.

12. The system of claim 11, wherein the multiport switch module adds a new network address to the address table based a detected free entry in the address table, the host processor selectively deleting a duplicate entry of the new network address from the external memory in response to detecting the added new network address in the address table.

* * * * *